May 23, 1972  N. A. PERKINS  3,664,560
BELT
Filed Jan. 16, 1970  5 Sheets-Sheet 1
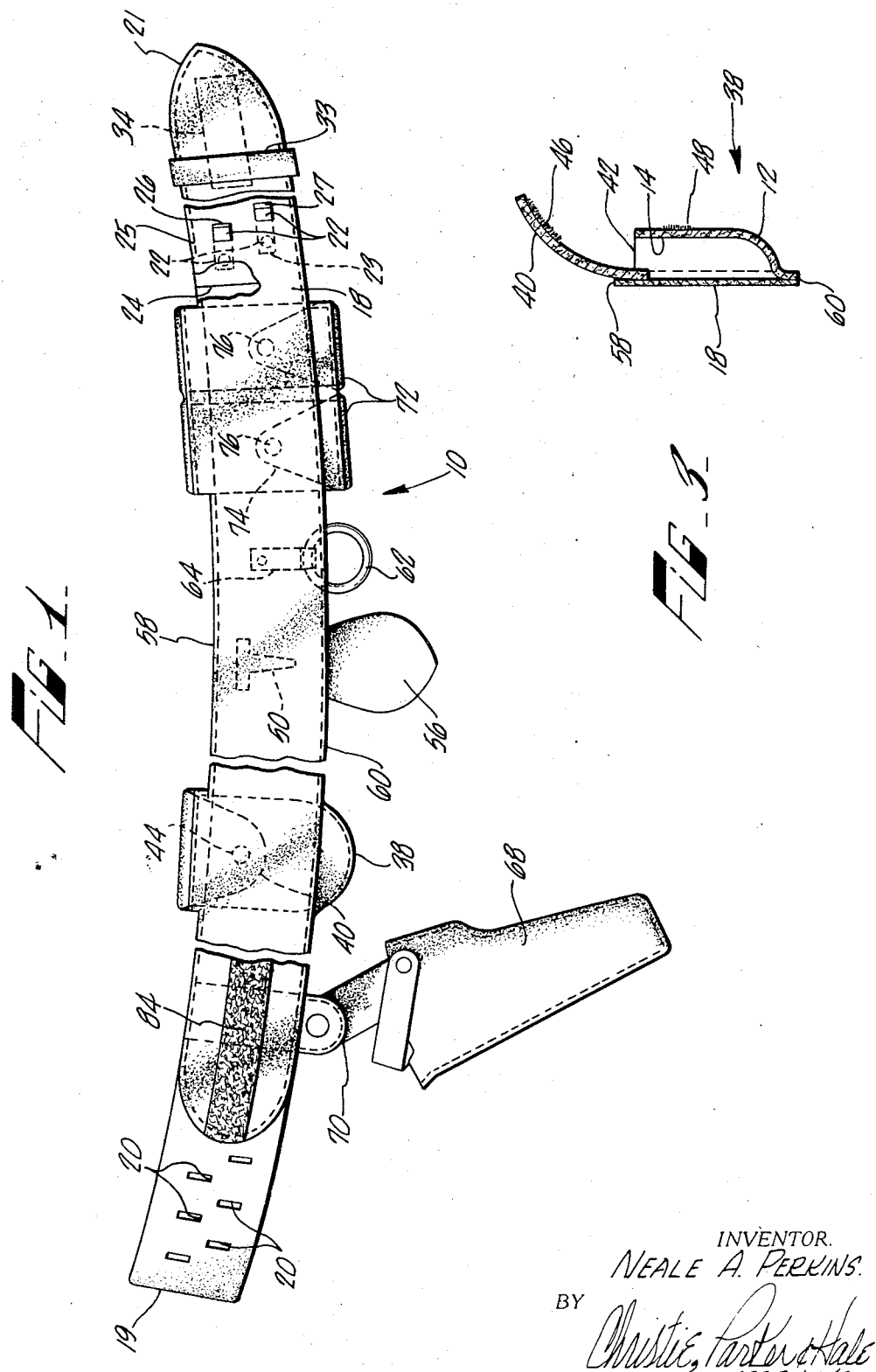
INVENTOR.
NEALE A. PERKINS.
BY
Christie, Parker & Hale
ATTORNEYS.

May 23, 1972  N. A. PERKINS  3,664,560
BELT
Filed Jan. 16, 1970  5 Sheets-Sheet 2
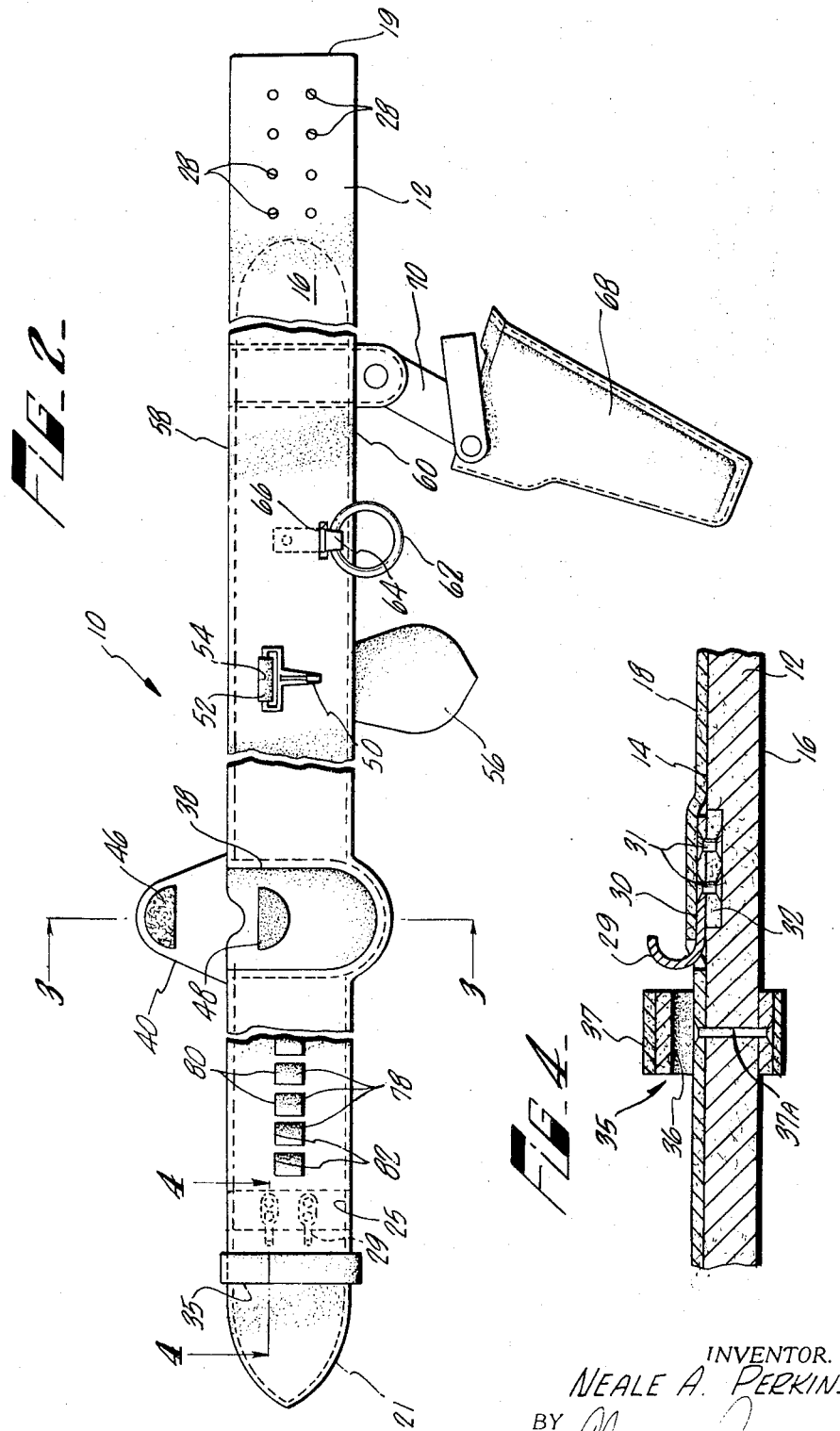
INVENTOR.
NEALE A. PERKINS
BY
Christie, Parker & Hale
ATTORNEYS

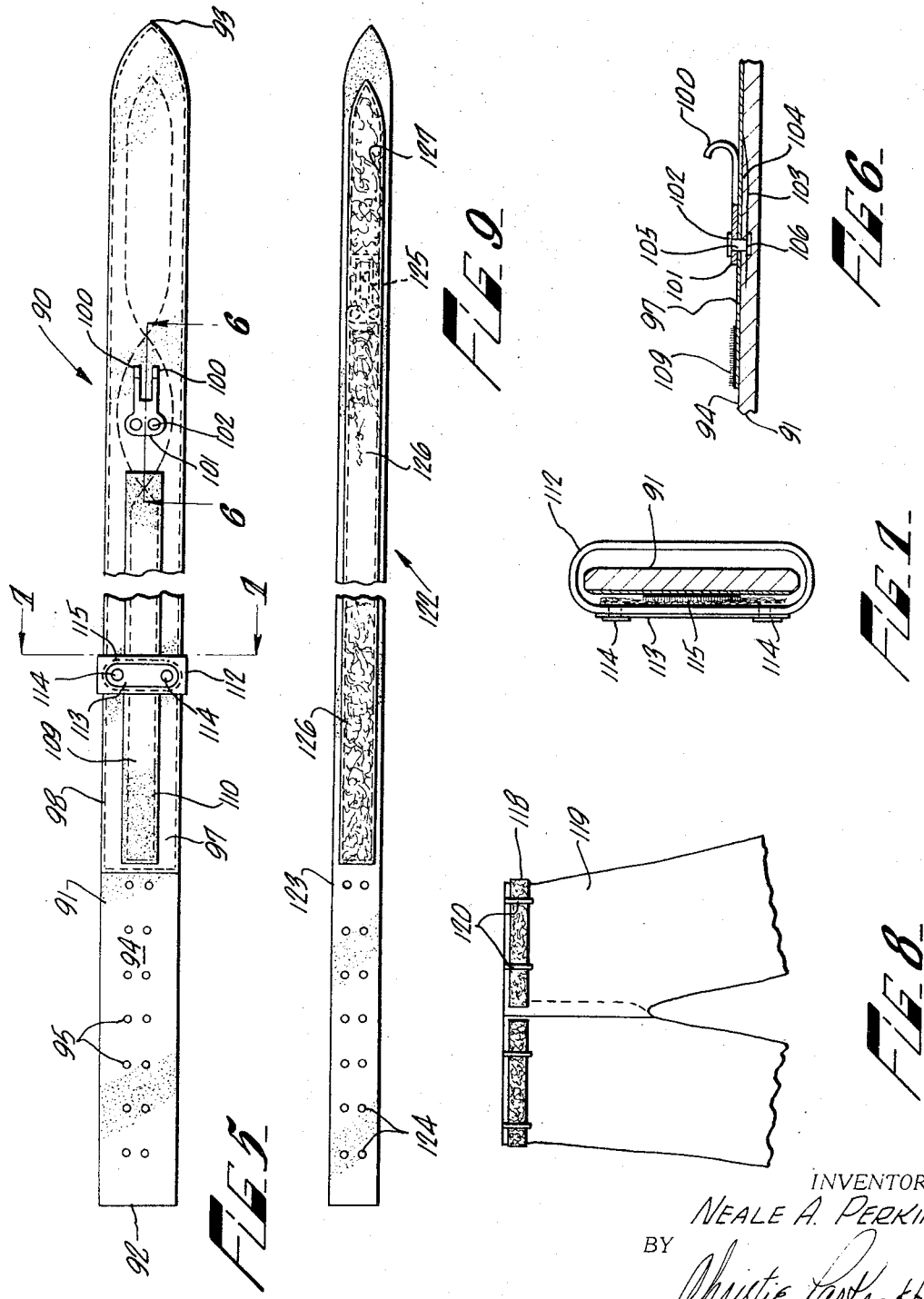

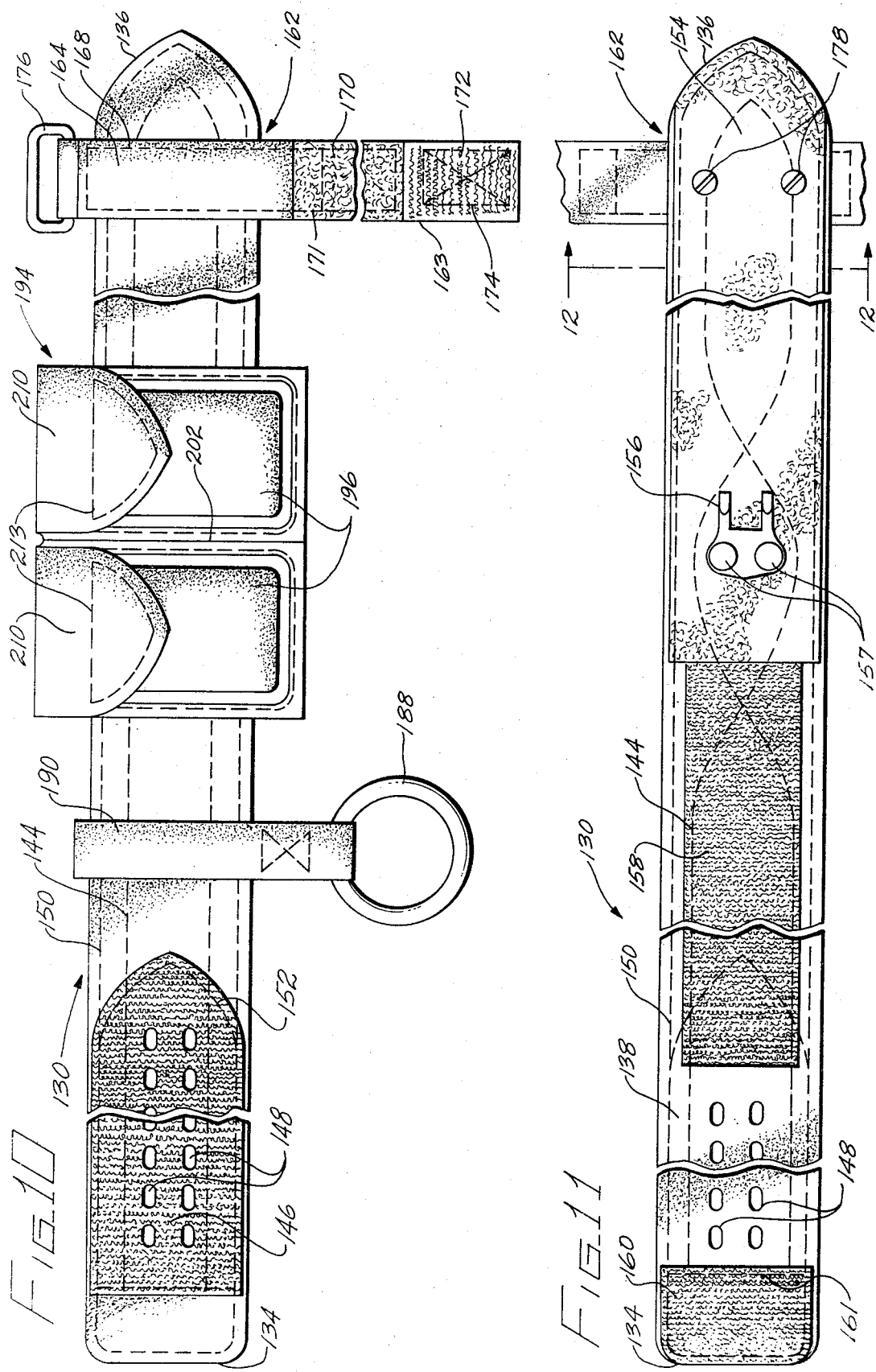

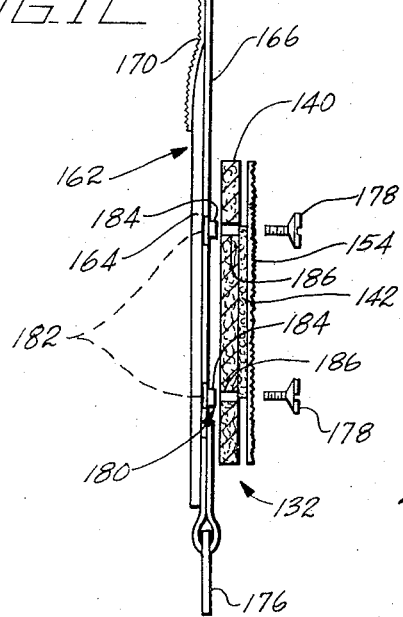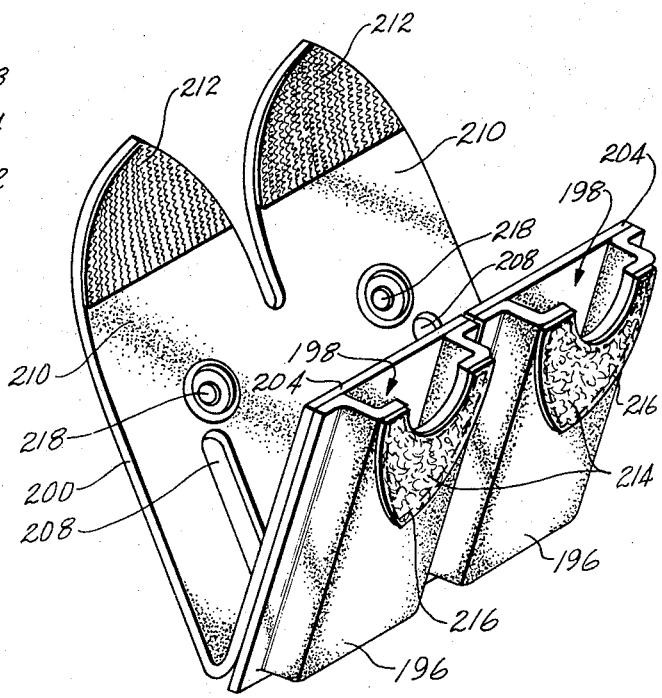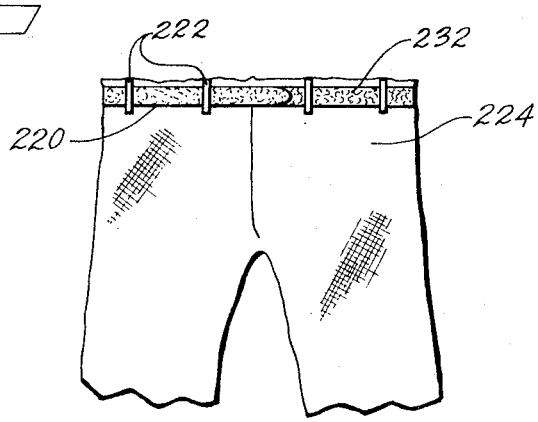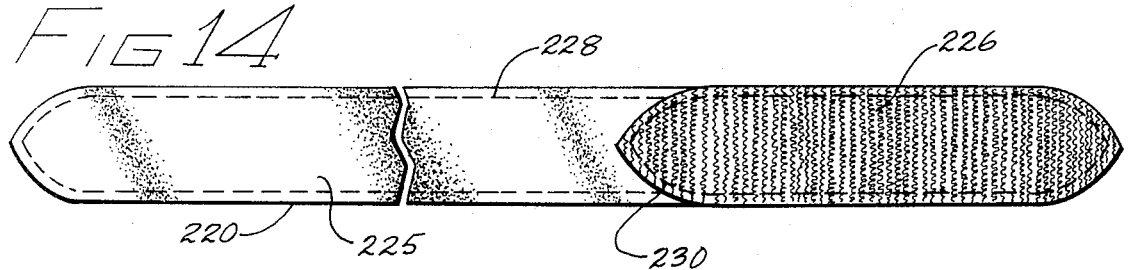

United States Patent Office 3,664,560
Patented May 23, 1972

3,664,560
BELT
Neale A. Perkins, Sierra Madre, Calif., assignor to Safariland Ltd., Inc., Monrovia, Calif.
Continuation-in-part of application Ser. No. 740,166, June 26, 1968. This application Jan. 16, 1970, Ser. No. 3,270
Int. Cl. F41b 13/04
U.S. Cl. 224—5 R
15 Claims

ABSTRACT OF THE DISCLOSURE

An elongated belt having an outer member and a lining secured to an inner side of the member. In one form of the invention, a portion of the outer member projects outwardly to define a pocket and a cartridge container for securing articles to the belt. The rear sides of the pocket and cartridge container are defined by the lining. In an alternative form of the invention, a pocket and a cartridge container are removably mounted on the belt. Brackets are mounted between the member and the lining and project through openings in the member to secure holding devices to the belt. Hidden hooks engage apertures in the belt to secure its ends to each other. A keeper for the free end of the belt includes a thistle-cloth fastener which mates with a cooperating fastener on the other end of the member. Alternatively, the keeper is drawn around the belt, through a guide loop at the free end of the belt, and folded back on itself for mating with a cooperating thistle-cloth fastener. A thistle-cloth fastener on the inner side of the belt secures the belt to the wearer's trousers or to a reversible dress belt which carries a mating fastener.

CROSS-REFERENCE TO RELATED APPLICATION

This application is a continuation-in-part of application Ser. No. 740,166, filed June 26, 1968 which has been abandoned.

BACKGROUND OF THE INVENTION

There are several styles of belts which have been used in the past for carrying firearms and other equipment used by law-enforcement officers. They are known as "Westerner Belts" and "Sam Browne Belts," the latter being chiefly used by police officers. The Sam Browne belts generally have more fittings for securing articles to the belt than do the Westerner belts. Another difference is that the Westerner belt is worn on the hips while the Sam Browne belt is worn on the waist.

Prior-art Sam Browne belts are relatively heavy, and as a consequence, they are generally secured to either a shoulder strap or a clothing belt. For the latter, a plurality of keepers must be secured to the belt to engage the clothing belt. The shoulder strap and keepers substantially increase the time required for an officer to remove or apply the belt. Moreover, the shoulder strap is uncomfortable, and the total thickness of the belts and keepers make the unsightly and uncomfortable. The conventional Sam Browne belt is fastened by a two-prong buckle, and a variety of holding devices such as handcuff pockets, gun holsters, and cartridge pouches, are looped over the belt and position at selected locations on the belt. These holding devices often make the belt relatively heavy and uncomfortable to wear. For example, they are ordinarily constructed of thick and stiff leather which makes then unyielding and bulky.

The often large and shiny buckle used on known belts can prove dangerous to police officers when, for example, making nighttime arrests or otherwise operating in darkness, as it gives the suspect a visible light-reflecting target at which to aim.

SUMMARY OF THE INVENTION

This invention provides an improved belt for carrying equipment used by law-enforcement officers. The belt does not require the use of a shoulder strap or a plurality of keepers for maintaining it in position when applied. Thus, the belt of this invention is more comfortable and can be removed and applied in substantially less time than the conventional Sam Browne belt. In one form of the invention, holding devices are formed integrally with the side of the belt, thereby making the belt more comfortable and lighter in weight.

Briefly, one form of this invention contemplates a belt which includes an elongated outer member having inner and outer sides, a portion of which preferably defines an outwardly projecting pocket. A lining is secured to the inner side of the outer member and defines a back wall of the pocket. Means are provided for closing the pocket and for securing ends of the belt to each other when it is worn.

Although this belt is adapted for a wide range of applications, it is particularly well adapted for use by police officers who are required to carry defensive and restraining equipment which is quickly accessible. In this form of the belt, every device for holding a particular article is integrally constructed with the belt, the belt itself defining some of the holding devices. The heretofore necessary loops for securing the devices to the belt are omitted. The inner side of the belt is therefore smooth and unobstructed. Moreover, many heavy and stiff leather parts are eliminated. The belt is therefore substantially lighter than an equivalent prior-art belt. Moreover, the belt is substantially more pliant, making it more comfortable to wear. Elimination of the mounting loops of the holding devices avoids chafing from pressure points. In addition, a substantially smaller amount of material and labor is necessary to manufacture the belt, making it less expensive than comparable prior-art belts.

Preferably, this form of the belt includes hidden hooks secured to the belt adjacent to one end for engaging apertures in the other end of the belt while it is worn. The hooks are preferably secured by rivets having thin heads positioned in a laterally split portion of the belt. This mounting conceals the head of the rivet when the belt is worn, and minimizes thickness of the belt adjacent the hooks. The need for a buckle is also eliminated, thus facilitating sliding of the belt around the waist to position the article-carrying devices as desired. The absence of a shiny buckle also removes the previously mentioned target.

To reduce the break-in period of the belt, which is the time during which it is most uncomfortable to wear, it is preferably arcuately shaped (concave upwardly) along its longitudinal axis. When fastened in place, it conforms to the actual contour of the wear's waist even when new. Conventional waist belts, on the other hand, require lengthy and uncomfortable break-in periods.

Some of the article-carrying devices, such as cartridge pouches or handcuff pockets, are, in a preferred embodiment of this belt, provided with a thistle-cloth fastener. This provides positive retention of closure flaps or covers, and also permits quick release when necessary.

An alternative form of the invention contemplates a belt which includes an elongated member having a body of thistle-cloth material secured to its inner side. A body of cooperating thistle-cloth material adapted for mounting on trousers of a wearer mates with the thistle-cloth material of the member to fasten the member to the trousers. The member is thereby prevented from moving relative to the trousers and does not need to be secured to either a shoulder strap or to a clothing belt by a plurality of keepers. A preferred form of this belt contemplates a dress belt having an inner layer of thistle-cloth material secured thereto worn on the user's trousers in conventional fashion. The dress belt is preferably reversible so that its inner layer of thistle-cloth material faces outwardly to mate with the thistle-cloth material of the member for mounting the member on the trousers.

BRIEF DESCRIPTION OF THE DRAWINGS

The features of specific embodiments of the best mode contemplated of carrying out the invention are illustrated in the drawings, in which:

FIG. 1 is a plan elevation view of an inner side of a contoured belt constructed in accordance with the present invention;

FIG. 2 is a view similar to FIG. 1 of the outer side of a straight belt;

FIG. 3 is a sectional elevation view taken on line 3—3 of FIG. 2;

FIG. 4 is a sectional elevation view taken on line 4—4 of FIG. 2;

FIG. 5 is a plan elevation view of an inner side of an alternative form of a belt according to the invention;

FIG. 6 is a sectional elevation view taken on line 6—6 of FIG. 5;

FIG. 7 is a sectional elevation view taken on line 7—7 of FIG. 5;

FIG. 8 is a frontal elevation view of a pair of trousers carrying a thistle-cloth fastener around the waist thereof;

FIG. 9 is a plan elevation view of an outer side of a dress belt carrying a fastener to which the article-carrying belt of this invention can be secured;

FIG. 10 is a plan elevation view of an outer side of an alternative form of a belt according to this invention;

FIG. 11 is a view similar to FIG. 10 of the inner side of the belt;

FIG. 12 is a sectional elevation view taken on line 12—12 of FIG. 11;

FIG. 13 is a perspective view of an alternative form of a cartridge container;

FIG. 14 is a plan elevation view of a reversible dress belt; and

FIG. 15 is a frontal elevation view of a pair of trousers carrying the reversible dress belt around the waist thereof.

DESCRIPTION OF THE PREFERRED EMBODIMENTS

Referring to FIGS. 1 and 2 which show identical belts, except that the one shown in FIG. 1 is contoured, and in which the same reference numerals are used to identify like parts, a belt 10 adapted to receive and hold a plurality of articles (not shown) includes an elongated outer member 12, having an inner side 14, an outer side 16, and a lining 18 secured to inner side 14 of outer member 12. An end 19 of the belt shown in FIG. 1 includes a plurality of elongated, laterally spaced, and axially offset apertures 20 which extend through the belt. Another end 21 includes a pair of equally spaced and offset hooks 22. The laterally spaced hooks provide stability for the belt when it is "buckled," and the offset apertures decrease the weakening effect resulting from the elongated shape of the apertures formed in the leather.

The hooks have an elongated, substantially J-shaped configuration, with a long leg 23 disposed between outer member 12 and lining 18. Preferably, the long legs are riveted to a leather insert 24, between the lining 18 and the outer member 12. The insert, lining and outer member are secured together by stitching 25. The hooks have curved portions 26 which extend inwardly through slits or apertures 27 in the lining to project toward opposite end 19 of the belt.

Another way of securing the ends of the belt to each other is shown in FIGS. 2 and 4. The belt includes a plurality of laterally spaced, axially parallel and substantially round apertures 28 adjacent to end 19. The apertures extend through the belt and have a diameter which is about equal to or slightly greater than the width of apertures 20 shown in FIG. 1. Opposite end 21 of the belt includes a pair of substantially J-shaped hooks 29 which project through an aperture in lining 18 and have elongated legs 30 disposed substantially parallel to the axis of the belt. Rivets 31 secure legs 30 to an insert 32 which has been carved out of outer member 12 of the belt. The insert is secured to the outer member by stitching 25 which also secures the lining 18 to the outer member and, preferably, by applying a conventional leather cement or other suitable bonding agent to the insert and the outer member.

This construction has the advantage over the mounting of hooks 22 shown in FIG. 1 that it is less bulky and gives the belt a smoother appearance. The result is a reduction in rubbing and chafing of the belt on the wearer. In addition, the joint or attachment between hooks 29 and the outer member is substantially stronger because insert 32 nests snugly in a complementary slot of the outer member.

Referring again to FIG. 1, a keeper 33 is secured to the belt, preferably adjacent to end 21 and projects inwardly from the belt such that opposite end 19 extends through it when the belt is worn. End 19 is thereby retained closely adjacent to the belt. To prevent end 21 from curling when the belt is worn, a thin, elongated leaf spring 34 is secured to the belt intermediate member 12 and lining 18 between hooks 22 and end 21.

An alternate embodiment of a keeper 35 is shown in FIGS. 2 and 4. This keeper has the same purpose as keeper 33 shown in FIG. 1 and secures end 19 of the belt against lining 18 when hooks 29 engage a pair of apertures 28. Keeper 35, however, is constructed of an inner layer 36 and an outer layer 37 which are bonded together. In one embodiment, the inner and the outer members or layers of keeper 35 are obtained by splitting the thickness of a leather strip longitudinally in the same way as insert 32 is carved from outer member 12 of the belt. After the layers have been split, a hole is cut through one side of inner layer 36 and the shaft of a rivet 37A is extended through the hole. The layers are then bonded together and the shaft of the rivet is pushed through a hole in belt 10 adjacent to its end 21. The end of the rivet adjacent to lining 18 is then upset to form another head and to secure keeper 35 to the belt. Ends of the strip defining the keeper are then brought together adjacent to the lining 18 and suitably secured to each other such as by conventional staples (not shown).

This keeper makes the belt more attractive in appearance, and incorporates the advantageous features of keeper 33 shown in FIG. 1. The rivet maintains the visible portion of keeper 35 aligned and neat when the belt is worn. To prevent separation of inner and outer layers 36 and 37, the keeper is preferably press-formed to give it a configuration complementary to that of the belt before it is riveted thereto. This further enhances the appearance of the keeper since it eliminates any tendency for the keeper to bulge away from the belt.

The outer member is preferably constructed of a heavy and robust leather, while the lining is constructed of a relatively soft, yet strong leather. Orthopedic elk leather has a low tannic-acid content, is non-hygroscopic, and resists damage from moisture and chemical deterioration caused by perspiration. Such leather is particularly well adapted for use as the lining, and has high strength as compared with other thin, soft leathers.

Although it is preferred to construct the lining of a soft leather, such as orthopedic elk leather, the lining may also be constructed of a conventional but preferably thinner leather than that of which outer member 12 is formed. The resulting belt is somewhat less expensive to produce, and provides most of the beneficial features of the belt provided with a soft leather lining. In all other respects the belt remains identical.

Referring to FIGS. 1 and 3, the outer member 12 is molded in a high-pressure hydraulic press to project outwardly and define a pocket 38. As best seen in FIG. 3, lining 18 is separated and laterally spaced from inner side 14 of outer member 12 to define a rear wall of the pocket. A flap 40 is stitched or otherwise secured to the lining to permit closure of an open end 42 of the pocket. Alternatively, and especially if the belt lining is constructed of a relatively heavy leather, flap 40 can be integrally formed with the lining. This eliminates the necessity of having to secure the flap to the lining in a separate operation.

The flap 40 and outer side of the pocket are provided with a suitable snap 44 (shown in FIG. 1) or with a body 46 of thistle-cloth pile and a body 48 of thistle-cloth hooks (shown in FIGS. 2 and 3). Thistle-cloth is a well-known fastener and has several advantages which are especially desirable in this application. The thistle-cloth fastener securely fastens the flap to the outer member irrespective of vibration or inadvertent pulls on the flap. To open the thistle-cloth fastener, the flap must be subjected to a continuous opening force which peels the flap away from the opposing body of the thistle-cloth. A snap, on the other hand, requires only a short pull or force of sufficient magnitude to disconnect it and thereby open the pocket. Articles such as handcuffs or cartridges carried in the pocket can thereby become lost when the snap fastener is inadvertently uncoupled.

Thistle-cloth fasteners are sold under the trademark "Velcro" and comprise a first body of pile material and a second body of hook material. The pile material includes many small loops and the hook material includes many small barb-like hooks. When the materials are pressed against each other, the hooks engage the loops to secure the two bodies of material together. The fasteners are inexpensive and can be engaged and separated many times without any noticeable wear.

A hook 50, preferably of the self-closing type, is positioned against outer side 16 of the member and is supported by a bracket 52. The bracket is secured to the belt intermediate the outer member and lining 18 and extends through an aperture 54 in the outer member. The bracket can be constructed of metal, or of a soft material such as leather. If constructed of a metal, it is preferably secured to a separate piece of leather (not shown) which in turn is stitched to the belt.

An elongated protective shield 56, preferably constructed of the same material used in outer member 12, is secured to the belt below hook 50. To give the protective shield flexibility when the belt is worn, and to permit the wearer to sit down without being prodded by a rigid shield, it is secured to the lining in the same way flap 40 (shown in FIG. 3) is attached. In addition, the lining extends over the full inner surface of the flap. Alternatively, the protective shield can be constructed integrally with outer member 12.

The protective shield protects clothing of the person wearing the belt from being damaged by keys or other implements (not shown) which are secured to hook 50. The hook and protective shield are therefore arranged such that the hook is positioned adjacent to an upper edge 58 of the belt, and the shield projects downwardly beneath the hook and from a lower edge 60 of the belt.

A baton ring 62 is secured to a bracket 64 in substantially the same manner as hook 50 is secured to bracket 52. The bracket extends through an aperture 66 in outer member 12. The baton ring is preferably a circular metal ring, and is used by police officers to carry a night stick (not shown) or similar equipment.

A conventional gun holster 68 provided with an upwardly extending tongue 70 can be secured to the belt by stitching the tongue to the outer member and the lining in a space intermediate the two or to the inner side of the lining. Preferably, it is secured to the belt such that the smooth and unobstructed inner side of the lining is not interrupted by the tongue.

Since the position of holster 68 is relatively critical and many persons wish to adjust its location frequently, the upper end of tongue 70 can alternatively be provided with a loop (not shown) through which the belt is threaded. Although the part of the loop behind lining 18 makes the holster less comfortable to wear than when it is stitched to the belt as described above, the holster is adjustable in position along the belt.

Referring to FIG. 1, one or more cartridge pouches 72 for storing individual cartridges (not shown) or automatic pistol magazines (not shown) are located adjacent end 21 of the belt. In a preferred embodiment of this invention, the pouches are formed by molding a portion of outer member 12 so it projects outwardly in a manner similar to pocket 38, with lining 18 defining the inner side of the pouch. An open lower end of each pouch is provided with a closure flap 74. To facilitate the removal of cartridges (or a magazine), the open end of the pouch points downwardly in a direction opposite to the open end 42 of the pocket 38. The cartridges thus drop out of the pouch when the flap is opened. The flap is secured to the pouch by either a conventional snap 76 or by bodies of thistle-cloth material (not shown) which are applied to the pouch and flap just as bodies 46 and 48 of thistle cloth are applied to pocket 38 and flap 40.

The cartridge pouches can alternatively be constructed by hinging them (not shown) to permit the whole pouch to be pivoted from a closed, upward-pointing direction into an open, downward-pointing direction. The pouches are then constructed separately of belt 10 in a conventional manner, and are secured by a flexible flap or tab to the lower edge of the belt just as flap 40 is secured thereto. Closure flaps (not shown) of the hinged pouches are secured to the lining adjacent upper edge 58 of the belt. The closure flaps and pouches are provided with snaps or thistle-cloth fasteners (not shown) such that the pouches are held in a closed upwardly pointing position when the fasteners are engaged. Upon disengagement of the fasteners, the pouches hinge or pivot downwardly around the flexible securing flap or tab to permit removal of the cartridges.

Referring to FIG. 2, cartridge loops 78 can be provided on the belt instead of pouches 72. The loops extend axially along outer side 16 of member 12. They are defined by an elongated strap 80, preferably leather, which projects through apertures 82 in the member and is stitched to the member. An individual cartridge (not shown) is inserted in each loop.

A belt constructed according to the present invention is versatile and is adapted to mount a variety of holding devices. It is lightweight and relatively pliant, thereby relieving substantially all of the discomfort experienced when wearing a comparable prior-art belt.

By virtue of the absence of any visible buckles, it is possible to stock a fewer number of belts to accommodate all waist sizes. For example, in the past it was necessary to stock a different size belt for each conventional belt size since an oversize belt is bulky and unslightly in appearance. The present belt, however, can be worn oversize since there is no buckle that must be aligned with the center of the wearer's waist, and since excess length of the belt is trimly concealed. Moreover, this belt can be rotated about the wearer's body into that position most comfortable and pratical to him. In the past this could not be done because the buckle had to be centered.

Referring to FIGS. 5–7, an alternative form of a belt 90 according to the invention includes an elongated outer member 91 having first and second ends 92 and 93, respectively, and an inner face or side 94. A plurality of laterally and longitudinally spaced holes 95 are formed through the outer member adjacent first end 92. Preferably, a lining 97, of a soft leather such as orthopedic elk leather, is cemented against inner side 94 of the outer member, and is further secured by a row of peripheral stitching 98.

A pair of J-shaped hooks 100 are integrally formed with hook base 101 which is in turn secured against the inner surface of the belt by a pair of rivets 102. Preferably, a cut or split 103 is skived through the belt between the upper and lower longitudinal edges thereof to define a flap or tongue 104 which can be partially lifted away from outer memebr 91 before lining 97 is cemented in place. Rivets 102 have shanks 105 extending through holes in tongue 104, and the rivets also have thin flat heads 106 resting against the inner surface of the tongue and concealed between the split portions of the outer member.

After lining 97 is secured to the outer member over the rivet shank, the hook base is positioned over the rivets and the exposed ends of the shanks are flattened as shown in FIG. 6 to anchor the hook base to the belt. This presently preferred method of mounting the hooks provides a thin and comfortable belt with no protrusions or rivet heads visible on the outer surface of the belt.

An elongated body of thistle-cloth hook material 109 is cemented to the inner surface of the belt against lining 97 and extends between holes 95 and hooks 100. Preferably, the hook material is further secured by a line of stitches 110 around the periphery of the hook material and extending to second end 93 of the belt to provide additional anchoring of lining 97 to outer member 91.

A keeper 112 is formed of a lether strip which extends around the belt. The ends of the strip are secured together by a stiff metal backing strap 113 (see FIG. 7) secured thereto by a pair of flat-head rivets 114. A body of thistle-cloth pile material 115 is cemented to an inner face of the keeper in alignment with back ing strap 113. Pile material 115 is further held in place by inner heads of rivets 114.

The keeper is moved along the belt to any desired position, and is then anchored in placed by pressing backing strap 113 to force pile material 115 on the inside of the keeper into mating engagement with hook material 109 on the inner side of the belt. The stiff metal backing strap insures secure engagement of this fastener and prevents any buckling of the keeper which might tend to disengage the thistle-cloth fastener and permit the keeper to shift from the selected position. The fastener is readily disengaged, however, by peeling the belt forwardly away from pile material 115, and the keeper can thus be relocated along the belt without difficulty.

Article-carrying devices such as a holster, cartridge pouch, and the like as described above are added to belt 90, but these components have been omitted in FIGS. 5–7 for clarity. In one form, the belt is used in combination with an elongated body of thistle-cloth pile material 118 which is sewed to a waistband of a pair of trousers 119 as shown in FIG. 8. The pile material has a soft, cushion-like texture, and is not abrasive or overly bulky to the touch when the trousers are worn without belt 90 in place.

If desired, conventional belt loops 120 can be provided on the trousers so a regular dress belt (not shown) can be slipped in place over the pile material. When belt 90 is to be worn, it is simply wrapped around the waistband of trousers 119 so that bodies of thistle-cloth material 109 and 118 are pressed into mating engagement. The belt is thereby securely and neatly held in a desired position around the waist of the user.

Alternatively, the user can wear a dress belt 122 (see FIG. 9) threaded through belt loops 120 on trousers 119. Belt 122 is formed from an elongated leather strap 123 having holes 124 at one end, and hook 125 adjacent to its other end. An elongated body of thistle-cloth pile material 126 is secured along the outer face of strap 123. The pile material is secured by peripheral stitching 127, but the stitching is preferably omitted immediately opposite hook 125 to permit the pile material to buckle away slightly from strap 123 when hook 125 is engaged in holes 124.

Belt 122 has a neat and trim appearance, and can be worn as a regular dress belt when, for example, a police officer is on duty in a station and does not need to carry with him a firearm, handcuffs, or the other implements normally carried by belt 90. Pile material 118 is of course omitted from trousers 119 when belt 122 is used to support the trousers.

Referring to FIGS. 10–12, an alternative form of a belt 130 according to this invention includes an elongated member 132 having first and second ends 134 and 136, respectively, and an inner side 138. Preferably, member 132 comprises an outer layer 140 (see FIG. 12) of heavy leather, and an inner lining 142 of nylon webbing material cemented against inner side 136 of outer layer 140 and further secured thereto by a row of stitching 144. The nylon inner lining 142 extends substantially the entire length of member 132 and in use prevents the leather outer layer 140 from stretching. The nylon webbing also provides additional strength for the belt which allows thinner leather to be used for outer layer 140 then in conventional Sam Browne belts.

An elongated body of thistle-cloth hook material 146 is cemented against the outer side of member 132 adjacent to first end 134, and a plurality of laterally and longitudinally spaced holes 148 are formed through member 132 and hook material 146 adjacent to first end 134 of the member. The hook material 140 extends lengthwise along the member for a distance slightly greater than the longitudinal distance traversed by holes 148. The hook material is further secured to the member by stitching 144, a row of stitching 150 extending around the periphery of the member, and a row of stitching 152 around the periphery of the hook material.

An elongated body of thistle-cloth pile material 154 is cemented against the exterior of nylon inner lining 142 adjacent to second end 136 of member 132 and is further secured thereto by stitching 144 and 150. A pair of J-shaped hooks 156 which are similar in construction to hooks 100 are secured to the exterior of pile material 154 by rivets 157 in a manner previously described in connection with hooks 100. The strength provided by nylon inner lining 142 secures rivets 157 to member 132 such that hooks 156 are substantially prevented from working loose from member 132 during use. An elongated body of thistle-cloth hook material 158 is cemented against the exterior of nylon inner lining 142 and extends substantially the entire length of member 132 between holes 148 and hooks 156. The hook material 158 is further secured to member 132 by stitching 144. A relatively small section of thistle-cloth hook material 160 is cemented against inner side 138 of member 132 adjacent to first end 134 and is further secured thereto by stitching 150 and by a row of stitching 161 extending around the periphery of the hook material.

A keeper 162 is secured to the outer side of member 132 adjacent to second end 136. The keeper includes an elongated strap 163 formed from a relatively short outer strip 164 of leather and a longer inner strip 166 of nylon webbing material which extends longitudinally away from the end of leather outer strip 164. Strap 163 is secured to member 132 by stitching 168 and is arranged to extend laterally downwardly away from the lower edge of the member as seen in FIG. 10. An elongated body of thistle-cloth pile material 170 is secured to an intermediate portion of strap 163 by stitching 171, and an elongated body of thistle-cloth hook material 172 is secured adjacent to the end of strap 163 by stitching 174. Keeper 162 further includes a strap guide loop 176 secured to the opposite end of strap 163 adjacent to the top edge of member 132, as seen in FIG. 10. The strap guide loop is secured to the strap as seen in FIG. 12 by drawing nylon strip 166 through the guide loop and folding the strip back on itself where it is secured by stitching 168.

Keeper 162 is removably secured to the outer side of member 132 by a pair of laetrally spaced screws 178 arranged for engagement with a cooperating pair of T-nuts 180 secured to the inner side of keeper strap 163.

Each T-nut defines both a respective hear portion 182 secured to strap 163 between nylon inner strip 166 and leather outer strip 164 and a respective internally threaded shank 184 extending laterally outwardly from the inner face of strap 163 through a respective hole 186 in member 132. Screws 178 are screwed into the shank portion of the T-nuts from the inner side of member 132 to securely hold keeper 162 in position against the outer side of member 132.

Belt 130 is adapted to carry a variety of article-carrying devices which are preferably looped over first end 134 of member 132 and slidably moved along the length of the belt to the desired location. One such article-carrying device is a baton ring 188 carried by a leather strap 190 slidably mounted on belt 130. Baton ring 188 is formed of injection molded nylon so that the ring is shatter-proof and relatively light in weight. The ring is preferably made of black nylon which in use does not present a shiny target at which to aim.

A cartridge container 194 is slidably mounted on belt 130. Preferably, the cartridge container comprises a pair of adjacent, upright cartridge pouches 196 each having an opening 198 at its top. An elongated leather strap 200 having a long and narrow slit 202 extending longitudinally inwardly from an end thereof approximately the length of cartridge pouches 196 defines a pair of leather strap segments 204 which in turn define the rear walls of cartridge pouches 196. Strap 200 is folded laterally across the bottoms of the cartridge pouches and extends upwardly adjacent to the pouch rear walls to define a strap intermediate section 206. This construction in effect hinges the bottom of each cartridge pouch to strap 200 to permit each pouch to pivot about its bottom laterally outwardly away from strap intermediate section 206, as seen best in FIG. 13. A pair of upright laterally spaced slots 208 are formed in strap intermediate section 206 for use in mounting cartridge container 194 on belt 130. A pair of closure flaps 210 are formed in the opposite end of strap 200 above strap intermediate section 206. A body of thistle-cloth hook material 212 is secured to the inner side of each closure flap 210 adjacent to its end by peripheral stitching 213, and a body of thistle-cloth pile material 214 is secured to the outer side of each cartridge pouch 196 by peripheral stitching 216. A male-type snap fastener (not shown) is secured to the rear side of each leather strap segment 204 for engagement with a cooperating female-type snap fastener 218 secured to the front side of strap intermediate section 208.

In use, cartridge container 194 is slidably mounted on belt 130 by threading the belt through slots 208 and sliding the cartridge container to the desired location on the belt. The top of each pouch 196 is secured in an upright position to strap intermediate section 208 by engaging the snap fastener on the rear wall of each pouch to its respective snap fastener 218. Each flap 210 closes its respective pouch opening 198 by mating thistle-cloth hook material 212 with thistle-cloth pile material 216. The cartridge pouches are thus held in a closed upright position on belt 130. To remove cartridges (not shown) from cartridge container 194, the snap fasteners of each cartridge pouch 196 are unfastened to allow the cartridge pouch to pivot about its bottom away from belt 130 to a downwardly-pointing direction. Flaps 210 are then opened by unfastening the thistle-cloth fasteners 212 and 216 to permit removal of the cartridges from the pouch.

Belt 130 during use is preferably worn in combination with a reversible dress belt 220 which is threaded through belt loops 222 of a pair of trousers 224. Dress belt 220 is formed from an elongated leather strap 225 having a relatively short body of thistle-cloth hook material 226 secured to the outer side of the strap adjacent to one of its ends. The thistle-cloth material is cemented against strap 225 and is further secured thereto by peripheral stitching 228 and 230. An elongated body of thistle-cloth pile material 232 is secured to preferably the entire length of the inner side of strap 225. In use, dress belt 220 is worn on trousers 224 in a conventional manner (not shown) with leather strap 225 facing outwardly. The dress belt is mounted on the trousers by drawing one of its ends through belt loops 222 and pressing thistle-cloth material 226 into mating engagement with the thistle-cloth material 232 on the inner side of the belt to secure the belt in the desired position around the waist. The belt is worn in this manner when, for example, a police officer is on duty but does not need to carry his firearm with him. When belt 130 is to be worn, dress belt 220 is initially unfastened and reversed so that its inner layer of thistle-cloth pile material 232 faces outwardly while being worn on trousers 224, as seen in FIG. 15. Belt 130 is then fastened to the trousers by wrapping it around the exterior of dress belt 220, engaging hooks 156 with the appropriate holes 148, and pressing the inner layer of thistle-cloth material 158 of belt 130 into mating engagement with the outwardly facing layer of thistle-cloth material 232 of dress belt 220. Keeper 162 is then fastened around belts 130 and 220 by first drawing the free end of strap 163 around dress belt 220 through guide loop 176, and then folding the strap back on itself to mate thistle-cloth material 172 with thistle-cloth material 170. Belt 130 is thereby securely held in a desired position around the waist of the user, and the two belts are prevented from sliding longitudinally relative to each other.

There has been described an article-carrying belt useful by policemen or others who are required by their duties to carry a variety of equipment. By virtue of its novel construction, the new belt is less expensive to produce, and more comfortable to wear than known belts used for this purpose in the past. The belt is relatively lightweight and thin, and has a trim appearance as compared to such known belts. Various modifications of the specific designs disclosed above will suggest themselves to those skilled in the art, and all such variations are intended to be incorporated within the scope of the following claims which define the invention in detail.

I claim:
1. A belt comprising:
 (a) an elongated member having inner and outer sides;
 (b) means for securing the ends of the member together to form a loop, the securing means including a hook secured to the inner side of the member adjacent to one of its ends, the hook being adapted to engage perforations extending through the member adjacent to its other end, and in which the member is split beneath the hook, and further comprising a rivet having a flat head disposed between the split portions of the member and having a shank portion extending inwardly through an inner split portion of the member into engagement with the hook;
 (c) an elongated first section of thistle-cloth material secured to the inner side of the member; and
 (d) an elongated second section of thistle-cloth material adapted for mounting on trousers of a wearer and defining a fastener when mated with the first section of thistle-cloth material on the member.

2. A belt comprising:
 (a) an elongated member having inner and outer sides;
 (b) means for securing the ends of the member together to form a loop;
 (c) an elongated first section of thistle-cloth material secured to the inner side of the member;
 (d) a keeper disposed over the ends of the member for maintaining the ends in their secured relation, the keeper having a body of thistle-cloth material secured to an inner face thereof and positioned to mate with the first section of thistle-cloth material on the member to define a fastener for anchoring the keeper in a selected position along the member; and
 (e) an elongated second section of thistle-cloth material adapted for mounting on trousers of a wearer and defining a fastener when mated with the first section of thistle-cloth material on the member.

3. A belt according to claim 2 in which the keeper includes a metal backing strap secured thereto behind the thistle-cloth material on the keeper to prevent lateral flexing of said thistle-cloth material.

4. A belt comprising:
(a) an elongated member having inner and outer sides;
(b) means for securing the ends of the member together to form a loop;
(c) a keeper disposed over the ends of the member for maintaining the ends in their secured relation, the keeper comprising (i) an elongated strap secured to the member adjacent to one of its ends and extending laterally away therefrom to define a free end remote from the member, (ii) a strap guide loop in axial alignment with the strap secured to the member remote from the free end of the strap, (iii) an elongated first body of thistle-cloth material secured to an intermediate portion of the outer side of the strap, and (iv) an elongated second body of cooperating thistle-cloth material secured to the outer side of the strap between the free end and the first body of thistle-cloth material, whereby the strap is drawn around the ends of the member with its free end drawn through the strap guide loop and folded back to define a fastener when the first body of thistle-cloth material is mated with the second body of thistle-cloth material;
(d) an elongated first section of thistle-cloth material secured to the inner side of the member; and
(e) an elongated second section of thistle-cloth material adapted for mounting on trousers of a wearer and defining a fastener when mated with the first section of thistle-cloth material on the member.

5. A belt comprising:
(a) an elongated first member having inner and outer sides;
(b) an elongated body of thistle-cloth material secured to the inner side of the first member;
(c) means for securing the ends of the first member together to form a loop with the outer side facing outwardly to provide a dress belt for mounting on trousers of a wearer, the securing means being adapted to secure the first member in a reversed position defining a belt having the thistle-cloth material on the inner side facing outwardly;
(d) an elongated second member having inner and outer sides;
(e) means for securing the ends of the second member together to form a loop;
(f) an elongated body of thistle-cloth material secured to the inner side of the second member for mating with the thistle-cloth material of the first member when the first member is in the reversed position to provide a fastener for mounting the second member on the trousers of the wearer; and
(g) a keeper disposed over the respective ends of the first and second members for maintaining the ends in their secured relation, the keeper comprising (i) an elongated strap secured to the outer side of the second member adjacent to the end where the hook is secured, the strap extending laterally away from the second member to define a free end remote from the second member, (ii) a strap guide loop in axial alignment with the strap secured to the second member remote from the free end of the strap, (iii) an elongated first body of thistle-cloth material secured to an intermediate portion of the outer side of the strap, and (iv) an elongated second body of cooperating thistle-cloth material secured to the outer side of the strap between the free end and the first body of thistle-cloth material, whereby the strap is drawn around the respective ends of the first and second members with the free end drawn through the strap guide loop and folded back to define a fastener when the first body of thistle-cloth material is mated with the second body of thistle-cloth material.

6. A belt comprising:
(a) an elongated member having inner and outer sides;
(b) means for releasably securing the ends of the member together to form a loop, the securing means including a hook secured to the inner side of the member adjacent to one of its ends, the hook being adapted to engage perforations extending through the member adjacent to its other end, and in which the member is split beneath the hook, and further comprising a rivet having a flat head disposed between the split portions of the member and having a shank portion extending inwardly through an inner split portion of the member into engagement with the hook;
(c) an elongated first section of thistle-cloth material secured to the inner side of the member; and
(d) an elongated second section of thistle-cloth material adapter for mounting on the waist area of trousers of a wearer, the second section of thistle-cloth material and the member being completely separable from each other, the second section of thistle-cloth material being adapted to frictionally engage the first section of thistle-cloth material to releasably secure the member to the trousers of the wearer.

7. A belt comprising:
(a) an elongated member having inner and outer sides;
(b) means for releasably securing the ends of the member together to form a loop;
(c) an elongated first section of thistle-cloth material secured to the inner side of the member;
(d) a keeper disposed over the ends of the member for maintaining the ends in their secured relation, the keeper having a body of thistle-cloth material secured to an inner face thereof and positioned to mate with the first section of thistle-cloth material on the member to define a fastener for anchoring the keeper in a selected position along the member; and
(e) an elongated second section of thistle-cloth material adapted for mounting on the waist area of trousers of a wearer, the second section of thistle-cloth material and the member being completely seprable from each other, the second section of thistle-cloth material being adapted to frictionally engage the first section of thistle-cloth material to releasably secure the member to the trousers of the wearer.

8. A belt according to claim 7 in which the second section of thistle-cloth material extends for a substantial length of the inner side of the member.

9. A belt comprising:
(a) an elongated member having inner and outer sides;
(b) means for releasably securing the ends of the member together to form a loop;
(c) a keeper disposed over the ends of the member for maintaining the ends in their secured relation, the keeper comprising (i) an elongated strap secured to the member adjacent to one of its ends and extending laterally away therefrom to define a free end remote from the member, (ii) a strap guide loop in axial alignment with the strap secured to the member remote from the free end of the strap, (iii) an elongated first body of thistle-cloth material secured to an intermediate portion of the outer side of the strap, and (iv) an elongated second body of cooperating thistle-cloth material secured to the outer side of the strap between the free end and the first body of thistle-cloth material, whereby the strap is drawn around the ends of the member with its free end drawn through the strap guide loop and folded back to define a fastener when the first body of thistle-cloth material is mated with the second body of thistle-cloth material;

3,664,560

13

(d) an elongated first section of thistle-cloth material secured to the inner side of the member;
(e) an elongated second section of thistle-cloth material adapted for mounting on the waist area of trousers of a wearer, the second section of thistle-cloth material and the member being completely separable from each other, the second section of thistle-cloth material being adapted to frictionally engage the first section of thistle-cloth material to releasably secure the member to the trousers of the wearer.

10. A belt comprising:
(a) an elongated first member having inner and outer sides;
(b) an elongated first body of thistle-cloth material secured to the inner side of the first member;
(c) means for securing the ends of the first member together to form a loop with the outer side facing outwardly to provide a dress belt for mounting on trousers of a wearer, the securing means also securing the first member in a reverse position defining a belt having the first body of thistle-cloth material facing outwardly;
(d) an elongated second member having inner and outer sides, the second member being completely seperable from the first member;
(e) means for securing the ends of the second member together to form a loop;
(f) an elongated body of thistle-cloth material secured to the inner side of the second member for mating with the first body of thistle-cloth material on the first member when the first member is in the reversed position to provide a fastener for releasably mounting the second member on the trousers of the wearer; and
(g) a keeper disposed over the respective ends of the first and second members for maintaining the ends in their secured relation, the keeper comprising (i) an elongated strap secured to the outer side of the second member adjacent to the end where the hook is secured, the strap extending laterally away from the second member to define a free end remote from the second member, (ii) a strap guide loop in axial alignment with the strap secured to the second member remote from the free end of the strap, (iii) an elongated first body of thistle-cloth material secured to an intermediate portion of the outer side of the strap, and (iv) an elongated second body of cooperating thistle-cloth material secured to the outer side of the strap between the free end and the first body of thistle-cloth material, whereby the strap is drawn around the respective ends of the first and second members with the free end drawn through the strap guide loop and folded back to define a fastener when the first body of thistle-cloth material is mated with the second body of thistle-cloth material.

11. A waist belt combination comprising:
(a) an elongated leather dress belt of sufficient length to extend around the waist of a wearer, the dress belt having an outer surface of dressed leather and an inner surface;
(b) a first type of thistle-cloth material secured to the inner surface of the dress belt;

14

(c) means for securing the ends of the dress belt together with the dressed outer surface facing outwardly to form a releasable loop for mounting on trousers of the wearer, the securing means also securing the dress belt in a reverse position providing a waist belt and fastener having the first type of thistle-cloth material facing outwardly;
(d) an elongated leather strap of sufficient length to extend around the waist of a wearer, the strap having an outer surface of dressed leather and an inner surface, the leather strap being completely separable from the dress belt and of such stiffness that it is capable of holding heavy articles such as firearm and a holster;
(e) means for securing the ends of the leather strap together to form a loop; and
(f) a second type of thistle-cloth material secured to the intermediate portion of the inner surface of the leather strap for frictionally mating with the first type of thistle-cloth material on the dress belt when the dress belt is in its reverse position to releasably mount the leather strap around the trousers of the wearer.

12. A belt combination according to claim 11 in which the securing means of the dress belt comprises an elongated body of thistle-cloth materials secured to the outer side of the first member adjacent to one of its ends for mating with the thistle-cloth material on the inner side.

13. A belt combination according to claim 11 in which the means for securing the ends of the leather strap includes a hook secured to the inner side of the member adjacent to one of its ends, the hook being adapted to engage perforations extending through the member adjacent to its other end.

14. A belt combination according to claim 11 including a keeper disposed over the respective ends of the dress belt and leather strap for maintaining the ends in their secured relation.

15. A belt combination according to claim 11 in which the first type of thistle-cloth material is substantially continuous for the length of the dress belt, and the second type of thistle-cloth material is substantially continuous for the length of the leather strap.

References Cited

UNITED STATES PATENTS

| D. 29,490 | 10/1898 | Varni-Gardinier | 224—26.2 |
|---|---|---|---|
| 1,558,228 | 4/1923 | Botkin | 224—5 UX |
| 3,543,977 | 12/1970 | Lockridge | 224—5 R |
| 1,418,371 | 6/1922 | Foster | 224—26.2 |
| 1,227,266 | 5/1917 | Himelspach | 224—23 |
| 1,845,705 | 10/1929 | Franz | 224—19 |
| 3,307,754 | 3/1967 | Anketell | 224—1 |
| 2,439,274 | 4/1948 | Spector | 224—4.5 |
| 3,501,774 | 3/1970 | Norman | 2—DIG. 6 |
| 3,128,476 | 4/1964 | Lash | 2—DIG. 6 |

GERALD M. FORLENZA, Primary Examiner

J. M. FORSBERG, Assistant Examiner

U.S. Cl. X.R.

2—312, 338; 224—19, 26 R

PO-1050
(5/69)

6725:WGM

UNITED STATES PATENT OFFICE
CERTIFICATE OF CORRECTION

Patent No. 3,664,560          Dated May 23, 1972

Inventor(s)     NEALE A. PERKINS

It is certified that error appears in the above-identified patent and that said Letters Patent are hereby corrected as shown below:

Col. 2, line 54, "wear's" should read --wearer's--;

Col. 6, line 56, "unslightly" should read --unsightly--;

Col. 7, line 25, "lether" should read --leather--;

Col. 7, line 30, "back ing" should read --backing--;

Col. 7, line 34, "in placed" should read --in place--;

Col. 8, line 72, "laetrally" should read --laterally--;

Col. 9, line 1, "hear portion" should read --head portion--;

Col. 9, line 6, "shank portion" should read --shank portions--;

Col.11, line 50, ":" should read --;--;
(Claim 5)

Col.12, line 21, "adapter" should read --adapted--;
(Claim 6)

Col.12, line 45, "seprable" should read --separable--.
(Claim 7)

Signed and sealed this 5th day of December 1972.

(SEAL)
Attest:

EDWARD M. FLETCHER, JR.
Attesting Officer

ROBERT GOTTSCHALK
Commissioner of Patents